US011490264B2

(12) United States Patent
Gummadi et al.

(10) Patent No.: US 11,490,264 B2
(45) Date of Patent: Nov. 1, 2022

(54) DYNAMIC SPECTRUM SHARING IN A MULTI-SUBSCRIBER IDENTITY MODULE DEVICE

(71) Applicant: QUALCOMM Incorporated, San Diego, CA (US)

(72) Inventors: Bapineedu Chowdary Gummadi, Hyderabad (IN); Balakrishna Godavarthi, Hyderabad (IN); Ravi Shankar Kadambala, Hyderabad (IN)

(73) Assignee: QUALCOMM Incorporated, San Diego (GA)

( * ) Notice: Subject to any disclaimer, the term of this patent is extended or adjusted under 35 U.S.C. 154(b) by 106 days.

(21) Appl. No.: 17/073,171

(22) Filed: Oct. 16, 2020

(65) Prior Publication Data

US 2022/0124509 A1  Apr. 21, 2022

(51) Int. Cl.
*H04W 16/14* (2009.01)
*H04W 8/18* (2009.01)
(Continued)

(52) U.S. Cl.
CPC .......... *H04W 16/14* (2013.01); *H04W 8/183* (2013.01); *H04W 72/0453* (2013.01); *H04W 88/06* (2013.01)

(58) Field of Classification Search
CPC . H04W 16/14; H04W 8/183; H04W 72/0453; H04W 88/06
See application file for complete search history.

(56) References Cited

U.S. PATENT DOCUMENTS

2016/0057504 A1* 2/2016 Shelby ................. H04W 16/14
                                                     725/62
2018/0376006 A1* 12/2018 Russell .................... H04W 4/14
(Continued)

FOREIGN PATENT DOCUMENTS

WO   WO-2013045898 A2 *  4/2013   ......... G06Q 20/3829
WO      2018141148 A1     8/2018
(Continued)

OTHER PUBLICATIONS

International Search Report and Written Opinion—PCT/US2021/052687—ISA/EPO—Jan. 19, 2022.

*Primary Examiner* — Julio R Perez
(74) *Attorney, Agent, or Firm* — Arent Fox, LLP

(57) ABSTRACT

An apparatus, method, and computer-readable medium for communicating with multiple subscriptions and dynamic spectrum sharing in a multi-subscriber identity module device are configured to scan for one or more first services corresponding to a first subscription and camp on a first service of the one or more first services corresponding to the first subscription on a first frequency band. The aspects are further configured to determine whether the first frequency band supports Dynamic Spectrum Sharing (DSS) and camp on a second service corresponding to a second subscription on the first frequency band in response to determining that the first frequency band supports the DSS. The aspects are further configured to scan for one or more second services corresponding to a second subscription in response to determining that the first frequency band does not support the DSS and camp on one of the one or more second services.

30 Claims, 8 Drawing Sheets

(51) Int. Cl.
*H04W 72/04* (2009.01)
*H04W 88/06* (2009.01)

(56) References Cited

U.S. PATENT DOCUMENTS

| | | | |
|---|---|---|---|
| 2019/0082491 A1* | 3/2019 | Shelby | H04W 76/28 |
| 2021/0022008 A1* | 1/2021 | Jeon | H04W 56/0015 |
| 2021/0183501 A1* | 6/2021 | Geis | G16H 15/00 |
| 2021/0250773 A1* | 8/2021 | Bhaskaran | H04W 76/15 |
| 2021/0282104 A1 | 9/2021 | Sagar et al. | |

FOREIGN PATENT DOCUMENTS

| | | | | |
|---|---|---|---|---|
| WO | WO-2019076428 A1 * | 4/2019 | | H04L 67/2809 |
| WO | 2020197695 A1 | 10/2020 | | |

* cited by examiner

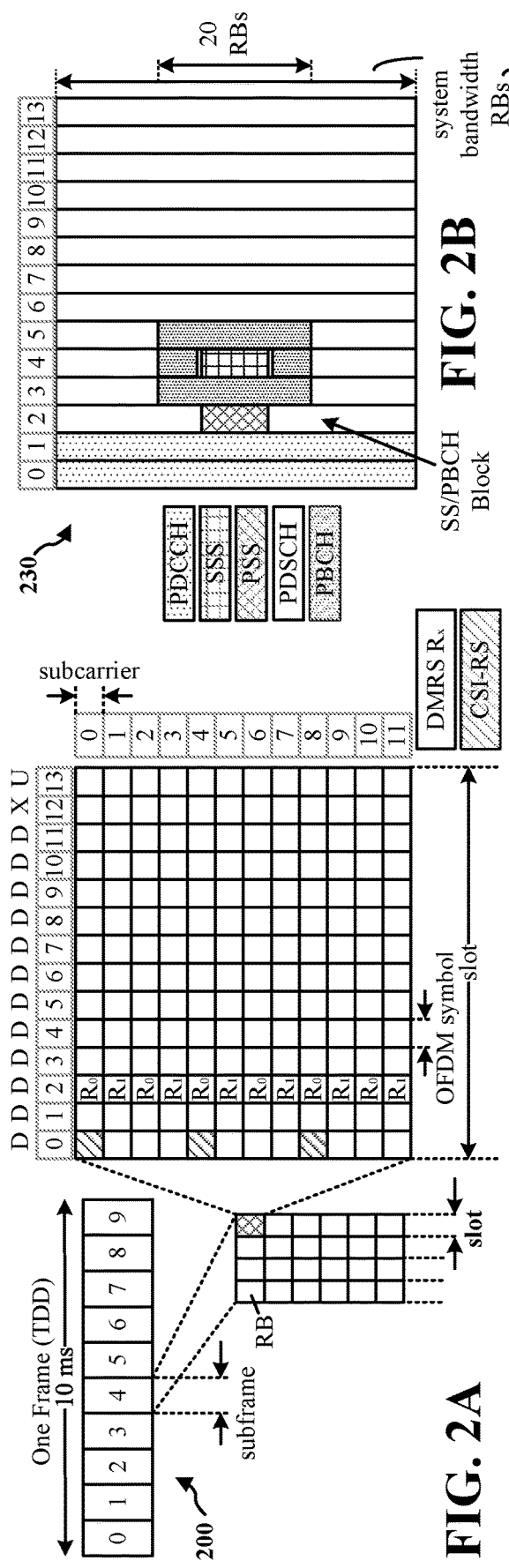
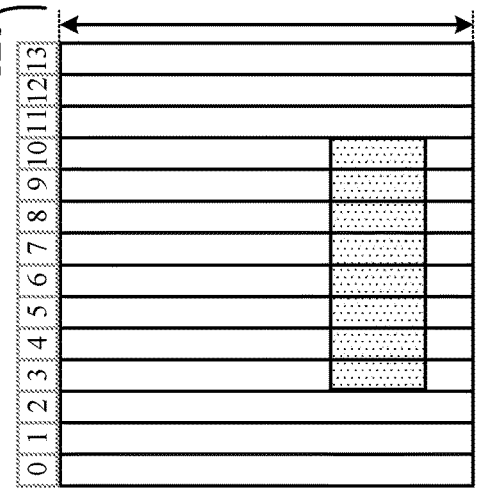
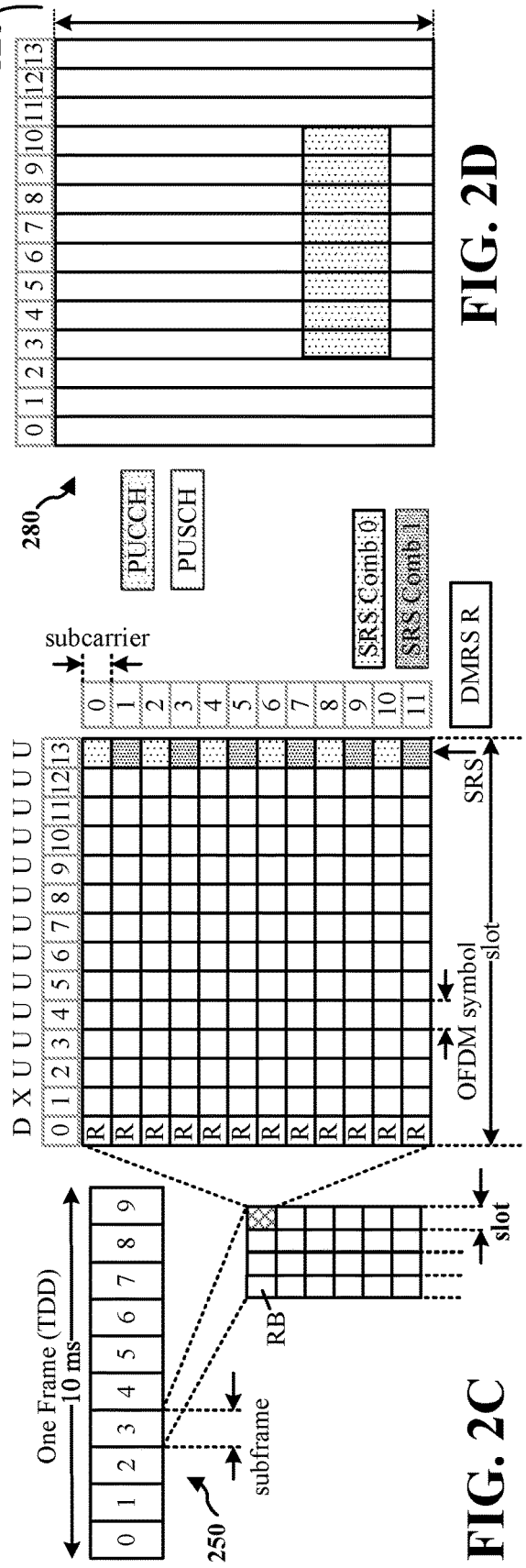
FIG. 2A  FIG. 2B  FIG. 2C  FIG. 2D

DYNAMIC SPECTRUM SHARING IN A MULTI-SUBSCRIBER IDENTITY MODULE DEVICE

TECHNICAL FIELD

The present disclosure relates generally to communication systems, and more particularly, to techniques for Dynamic Spectrum Sharing (DSS) in a multi-subscriber identity module device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some wireless networks, a user equipment (UE) can have multiple subscriptions to one or more networks (e.g., by employing multiple subscriber identity module (SIM) cards or otherwise). Such a UE may include, but is not limited to, a dual-SIM, dual standby (DSDS) device. For example, a first subscription may support a first technology standard, such as one of LTE or 5G NR while a second subscription may support a second technology standard, such as another one of LTE or 5G NR. Where the UE utilizes a single transceiver to communicate over the multiple subscriptions and/or networks, the UE can tune the transceiver to a given subscription and/or network during a given period of time to communicate therewith, but can only communicate in a single subscription and/or network at a given period of time. As such, when the UE has an active call with the first subscription, the UE may periodically tune away to the second subscription to monitor signals or acquire a connection. During such a tune away mode, the UE loses throughput on the active call with the first subscription due to the inability to receive signals corresponding to the first subscription. Further, if the tune away mode persists for a relatively long time, then the network managing the active call of the first subscription may determine that the UE is no longer connected due to lack of activity, and thus may terminate the active call of the first subscription.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may communicate with multiple subscriptions. The apparatus may include a memory, and at least one processor coupled to the memory. The processor is configured to scan for one or more first services corresponding to a first subscription. The processor is configured to camp on a first service of the one or more first services corresponding to the first subscription on a first frequency band. The processor is configured to determine whether the first frequency band supports DSS. The processor is configured to camp on a second service corresponding to a second subscription on the first frequency band in response to determining that the first frequency band supports the DSS. The processor is configured to scan for one or more second services corresponding to a second subscription in response to determining that the first frequency band does not support the DSS. The processor is configured to camp on one of the one or more second services.

Optionally, in some aspects, the method, computer-readable medium, and/or processor may be further configured to switch the first service corresponding to the first subscription from the first frequency band to a second frequency band, determine whether the second frequency band supports the DSS, and switch the second service corresponding to the second subscription to the second frequency band in response to determining that the second frequency band supports the DSS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
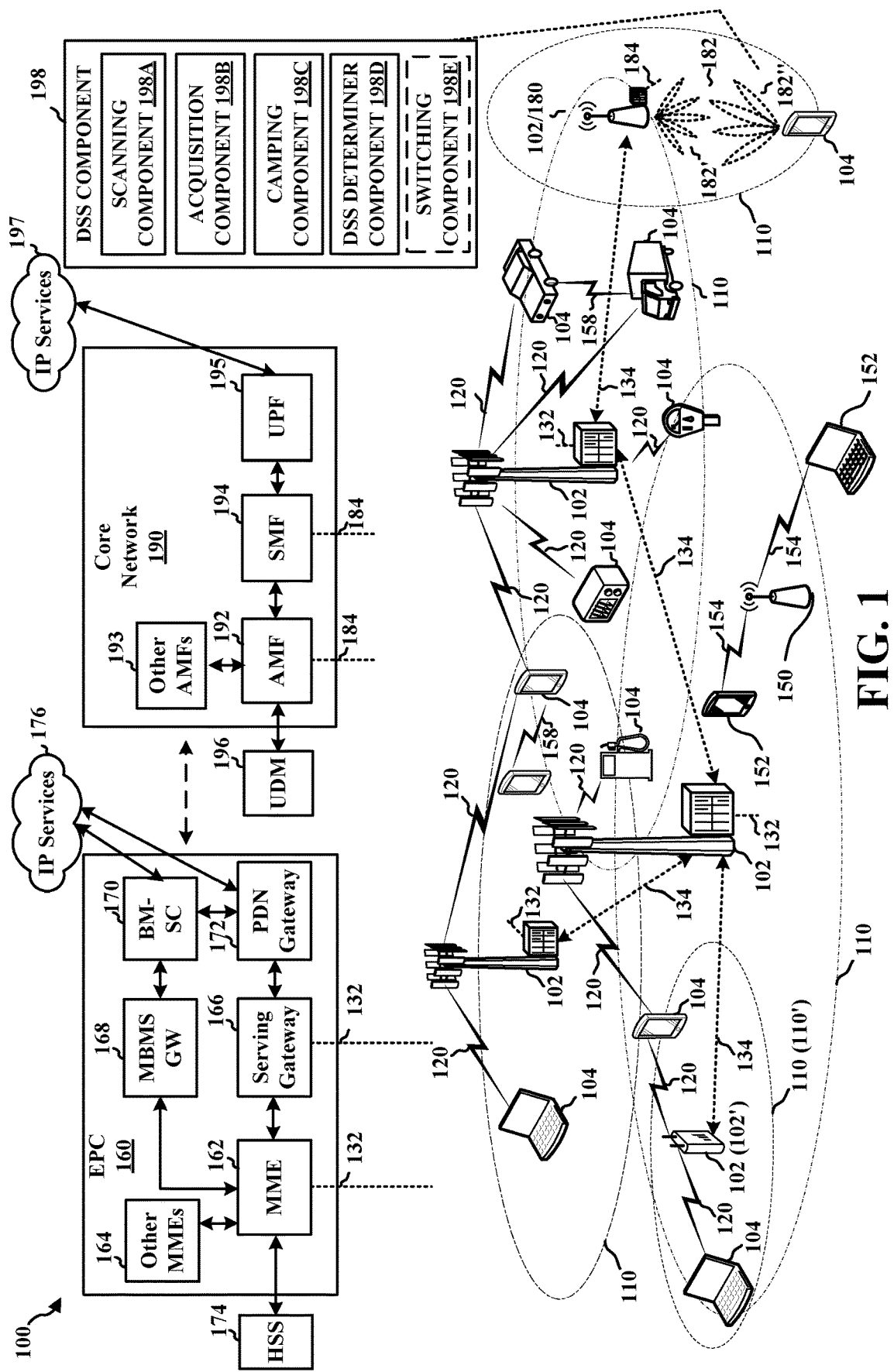
FIG. 1 is a diagram illustrating an example of a wireless communications system including a user equipment having a dynamic spectrum sharing (DSS) component as described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In dynamic spectrum sharing (DSS), LTE and NR (on low frequency bands) may exist together i.e., both the technologies (LTE and NR) operating independently on the same bandwidth. Both the technologies can use the same frequency bands thereby allowing greater spectral efficiency at no additional cost. Such frequency band utilization may allow operators to deploy NR on the existing LTE spectrum, which can also ensure reuse of most of the existing infrastructure.

A multi-SIM device (e.g., a multi-SIM UE) with the same operator may be used in several scenarios. One such scenario may be when a first SIM is for personal use and a second SIM is for official or business use. Another scenario may be when the first SIM with a first subscription (SUB) may be used for voice calls (e.g., on LTE) and the second SIM with a second SUB may be used for data (e.g., on NR). Also, in some cases, both SUBs may be on a same technology, e.g., NR, but page collisions may occur, thereby causing the UE to have one SUB fallback to a different technology in order to avoid the page collisions. In these cases, where the two SUBs are on different technologies or where the two SUBs on the same technology, but page collisions caused one of the SUBs to fallback to a different technology, then the UE may utilize frequency tune aways to tune to the idle SUB or non-Default Data Subscription (non-DDS) SUB in order to receive pages and/or for channel maintenance.

In one scenario, with an NR SUB on a first SIM and an LTE SUB on a second SIM of a UE, with the same operator offering services for both SUBs, it may be possible that DSS is enabled on the UE and it is possible for both the SUBs to camp on the same DSS band. The initial band scanning for the UE to camp on a cell may happen in a sequential order. The prioritized frequency bands may be scanned first followed by the remaining frequency bands which may be scanned in an ascending order. The solution of the present disclosure may allow the DSS bands to be at a higher precedence for scanning in a priority list and at a higher precedence in a non-prioritized list. The non-prioritized list may be the list that is scanned after the priority list is scanned.

When the UE receives an indication of DSS support and if the NR SUB is camped on a DSS frequency band, the solution of the present disclosure may allow scanning of the LTE SUB on the same frequency band and camping at the same frequency as the NR SUB, when no frequency band preference is set for the LTE SUB. For instance, if the NR SUB is camped on frequency band N3 which is operating on DSS, the LTE SUB may camp on the frequency band mentioned in an information element (IE) received from a base station. In one example, when the LTE SUB has no frequency band preference, the UE may camp in a sequential order of frequency bands such as B1, B2, B3, etc. In another example, if the LTE SUB has a frequency band preference, the UE may scan the preferred frequency bands, and if no cell is found on the preferred frequency bands, the UE may directly attempt camping on the frequency band indicated in the IE. Further, in another example, if the operator deems that the DSS band is overloaded, the base station may redirect the UE to camp on other frequency bands by changing the frequency band priorities. If the resultant frequency band (i.e., after redirection) is again a DSS band, the UE may camp on the DSS band for the LTE SUB. In another example, if the NR SUB is moved from a non-DSS band to a DSS band, the present solution allows the UE to reselect LTE SUB also to the DSS band and vice-versa.

In another example, the first SUB may be (LTE+NR), and the second SUB may be LTE, where Evolved-Universal Terrestrial Radio Access-New Radio (ENDC) is enabled on the first SUB and LTE on the second SUB. The solution of the present disclosure may allow NR on the first SUB and LTE on the second SUB on the DSS band. The solution of the present disclosure allows a reselection process so that when NR on a DSS enabled frequency band is added, the LTE on the second SUB may move to the DSS enabled band as well, thereby ensuring that the first SUB and the second SUB can operate in parallel. In this example, the LTE on the first SUB and the LTE on the second SUB may not be camped on the same frequency band because the DSS may not be efficient for both ENDC carriers to be in the same frequency band, and if LTE on both the first SUB and the second SUB are on the same frequency band, it may result in page collisions and the Radio Access Technology (RAT) on the second SUB (non-DDS SUB) may be downgraded.

In another example, the first SUB may be (LTE+NR), and the second SUB may be NR, where either LTE or NR of the ENDC, and the NR on the second SUB may be of a DSS enabled band frequency band. The solution of the present disclosure may allow the LTE on the first SUB to move to the DSS enabled band during cell reselection, in a similar manner as discussed in the previous example.

Further, when both the first and second SUBs may be NR, page collisions are likely to occur. To avoid page collisions, in one implementation one of the first or the second SUB which may be a non-DDS SUB may fall back to LTE, with the other SUB continuing on NR. Such an NR+LTE situation may be common when both the SUBs are of the same operator. In this NR+LTE situation, there may be frequency tune-away to the idle SUB or non-DDS SUB to read pages and for channel maintenance. The present disclosure provides apparatus and methods for avoiding or reducing such frequency tune-away when DSS is enabled and improve communication performance of the multi-SIM UE.

The solution of the present disclosure may reduce scan time for an LTE SUB as, for the LTE SUB, the UE may camp directly on the frequency of the NR SUB. The solution may also avoid tune-away for the LTE SUB when the operating frequency of the LTE SUB and the NR SUB is the same. Faster scanning and avoidance of frequent tune-aways may also provide power savings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to communicate with multiple subscriptions using a DSS component 198. The DSS component 198 may include a scanning component 198A for scanning one or more first services corresponding to a first subscription and for scanning for one or more second services corresponding to a second subscription, an acquisition component 198B for acquiring a first service of the one or more first services corresponding to the first subscription and for acquiring a second service of the one or more second services corresponding to the second subscription, a camping component 198C for camping on the first service on a first frequency band and camping on the second service, a DSS determiner component 198D for determining whether the first frequency band supports DSS and determining whether a second frequency band supports the DSS. The DSS component 198 may also include a switching component 198E for switching the first service corresponding to the first subscription from the first frequency band to the second frequency band and in response to determining that the second frequency band supports the DSS, switching the second service corresponding to the second subscription to the second frequency band.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A to 2D include frame structures, channels, and resources that may be used by UE 104 and/or base station 102/180 for communicating in wireless communications system 100. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
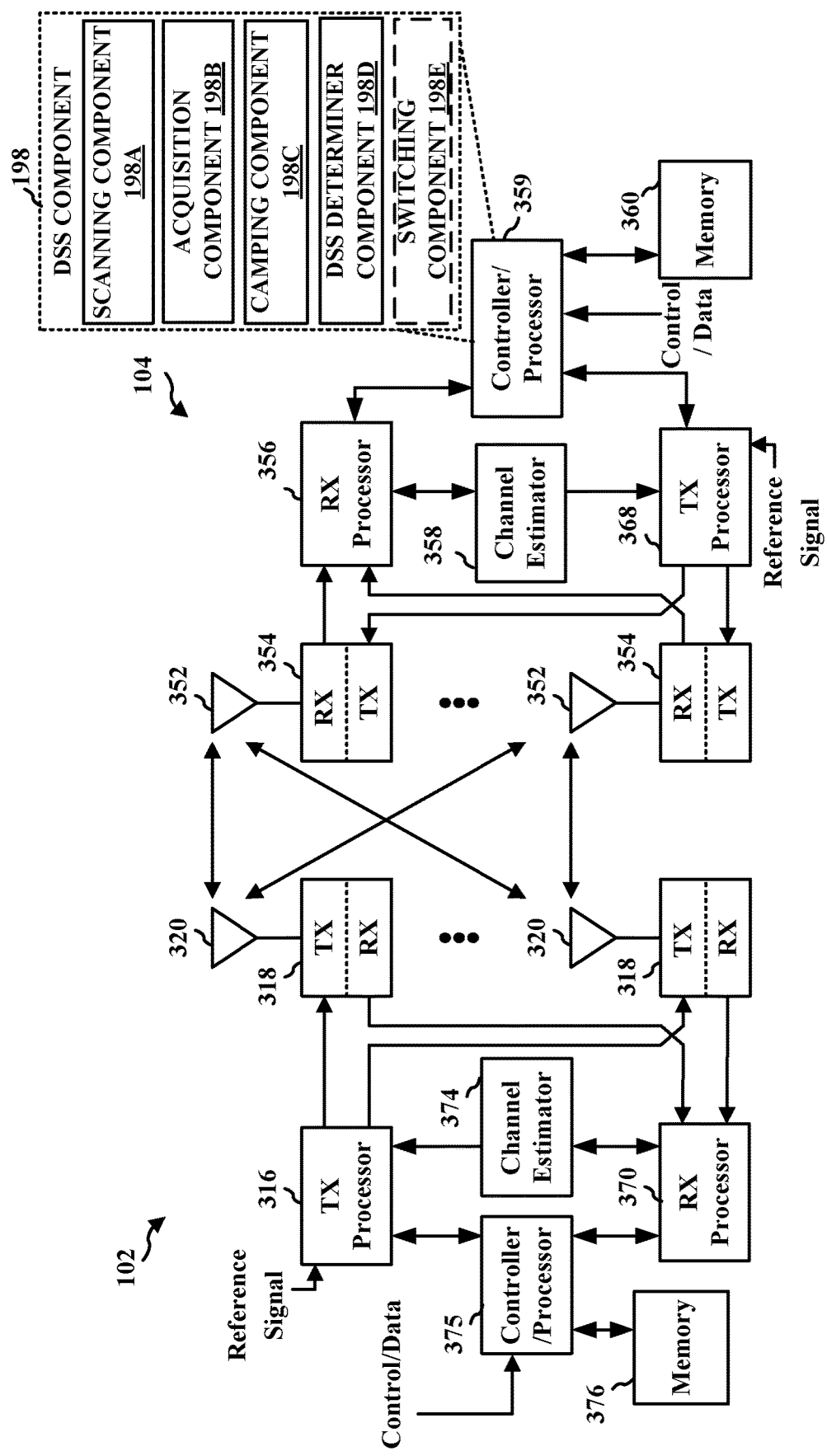
FIG. 3 is a diagram illustrating an example of a base station and UE in an access network.

FIG. 3 is a block diagram of hardware components of base station 102 (and/or 180) in communication with UE 104 in wireless communications system 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

In the UE 104, at least one of the TX processor 368, the RX processor 356, and the controller/processor 359 may be configured to perform aspects in connection with the DSS component 198 as described herein.

Figure 4:
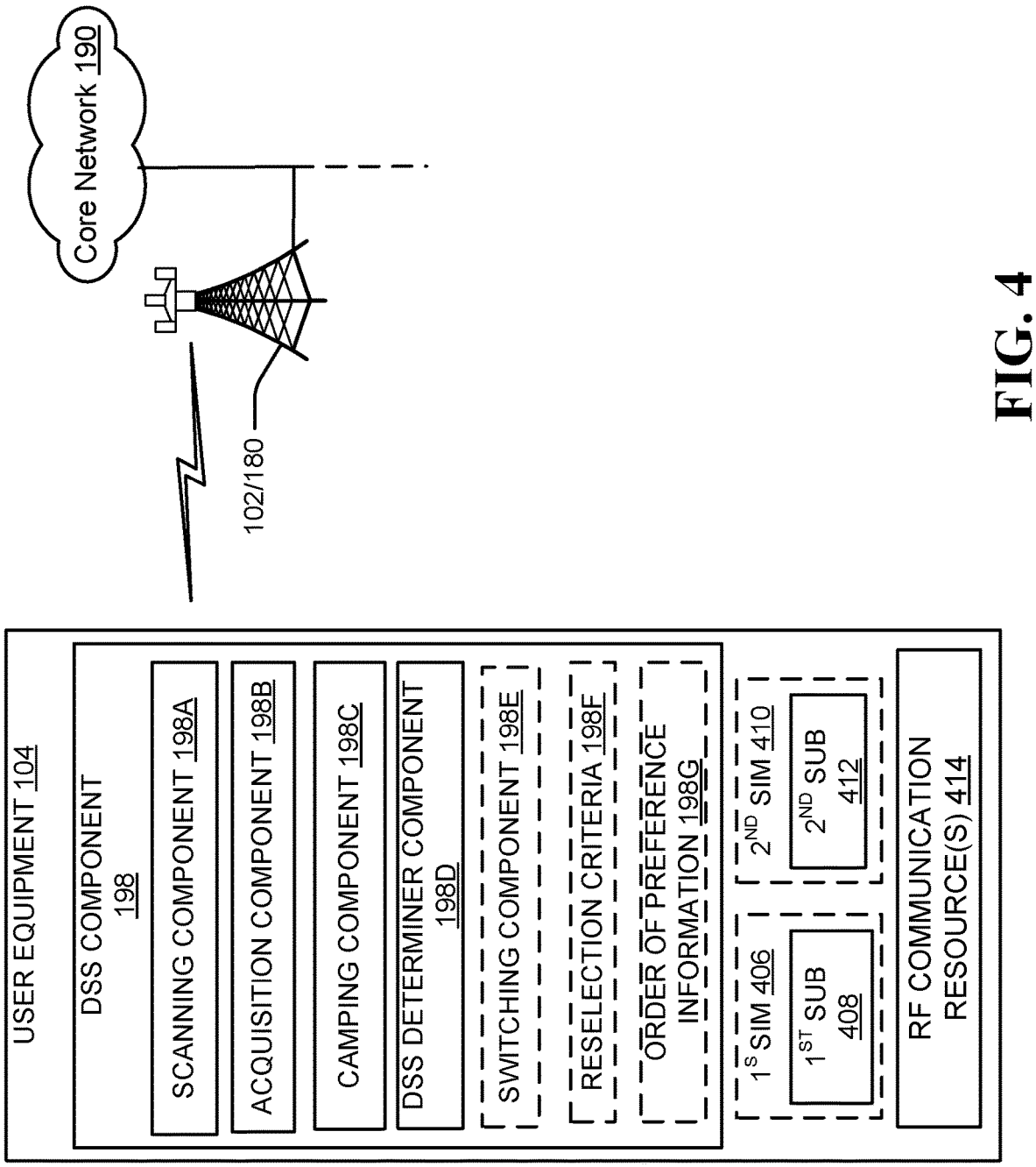
FIG. 4 is a diagram illustrating an example UE configured to communicate with multiple subscriptions and supporting improved communication capabilities using DSS.

Referring to FIG. 4, in one aspect, UE 104 utilizes DSS component 198 to control the use of multiple SUBS to communicate with the base station 102/180 (as described above with reference to FIG. 1). In an example, the UE 104 can have a first SUB 408 related to a first core network 190 and a second SUB 412 related to the same network, such as the first core network 190, or to a different network, such as to a second network (not shown in FIG. 4 for simplification). For instance, each of the first SUB 408 and the second SUB 412 may relate to a different account and/or different services on the same network or on different networks. In some aspects, each of the first SUB 408 and the second SUB 412 optionally may be maintained on a first SIM 406 and a second SIM 410, respectively. As such, in one aspect, the UE 104 may be a multi-SIM, multi-standby device, such as a dual-SIM, dual standby (DSDS) device.

In one implementation, the UE 104 can communicate in the first core network 190 via the base station 102/180 using the first SUB 408 and the UE 104 can communicate with the first core network 190 via the base station 102/180 using the second SUB 412. For example, the UE 104 can communicate using the first SUB 408 using a first RAT (e.g., NR) and the UE 104 can communicate using the second SUB 412 using the first RAT or a second RAT (e.g., LTE). Additionally, the base station 102/180 may be a macrocell, picocell, femtocell, relay, Node B, mobile Node B, UE (e.g., communicating in peer-to-peer or ad-hoc mode with the UE 104), or substantially any type of component that can communicate with UE 104 to provide wireless network access via a SUB at the UE 104.

In an example of DSS operation according to the present aspects, the UE 104 operate the DSS component 198 to camp on a first service corresponding to the first SUB 408 and camp on a second service corresponding to the second SUB 412 based on determining whether a frequency band supports DSS or not. The DSS component 198 includes the scanning component 198A, which may scan one or more first services corresponding to the first SUB 408 and scan one or more second services corresponding to the second SUB 412, the acquisition component 198B for acquiring the first service corresponding to the first SUB 408 and for acquiring the second service corresponding to the second SUB 412, the camping component 198C for camping on the first service on a first frequency band and camping on the second service, and the DSS determiner component 198D for determining whether the first frequency band supports DSS and determining whether a second frequency band supports the DSS.

The DSS component 198 may also include a switching component 198E for switching the first service corresponding to the first SUB 408 from the first frequency band to the second frequency band. The switching component 198E may also switch the second service corresponding to the second SUB 412 to the second frequency band and in response to determining that the second frequency band supports the DSS. The switching component 198E may switch the first service corresponding to the first SUB 408 from the first frequency band to the second frequency band based on reselection criteria 198F and/or order of preference information 198G. The reselection criteria 198F may include a frequency band priority (e.g., a priority frequency band for the first SUB 408), received signal strength (e.g., a threshold value of received signal strength to be satisfied to successfully switch), and a rank index (e.g., an index specifying ranks of frequency bands in order of priority). The order of preference information 198G may include information about the preferential order of frequency bands that may be camped on for the first service. The UE 104 may also include RF communication resources 414 configured to transmit and/or receive the communication exchange signaling to and/or from one or more base stations or other devices in the wireless communication system 400. For example, RF communication resources 414 may include, but are not limited to, one or more of a transmitter, a receiver, a transceiver, protocol stacks, transmit chain components, and receive chain components. In some aspects, RF communication resources 414 may be dedicated to operate according to the standards and procedures of a single one of the first SUB 408 or the second SUB 412 at any given time. For instance, although not to be construed as limiting, RF communication resources 414 may be associated with a multi-SIM, multi-standby device, such as a dual-SIM, dual standby (DSDS) device.

In one example, the first service corresponding to the first SUB 408 is NR and the second service corresponding to the second SUB 412 is LTE with the first SUB 408 and the second SUB 412 on the same first core network 190 (e.g., offered by one operator). When the UE 104 is switched on, the scanning component 198A may scan for one or more first services corresponding to the first SUB 408. For example, the scanning component 198A may scan one or more frequency bands for a first service according to a priority list of frequency bands for the first SUB 408 specified in the order of preference information 198G. On identifying availability of the first service on a first frequency band, the camping component 198C may camp the first SUB 408 on the first frequency band. The DSS determiner component 198D may determine whether the first frequency band supports DSS. For example, the DSS determiner component 198D may verify the first frequency band against a list of frequency bands that support DSS. In one implementation, the list of frequency bands that support DSS may be received from the base station 102/180. In another implementation, the list of frequency bands that support DSS may be stored at the UE 104. If the DSS determiner component 198D determines that the first frequency band supports DSS, the DSS determiner component 198D may send the information about the support for DSS on the first frequency band to the camping component 198C. The camping component 198C on receiving the information that the first frequency band supports DSS, may camp the second SUB 412 on the first frequency band. The DSS component 198 of the UE 104 allows the first SUB 408 and the second SUB 412 to camp on the same (first) frequency band when the first frequency band supports DSS. If the DSS determiner component 198D determines that the first frequency band does not support DSS, the DSS determiner component 198D may send the information about the first frequency band not supporting DSS to the scanning component 198A. The scanning component 198A may scan for one or more second services corresponding to the second SUB 412. For example, the scanning component 198A may scan one or more frequency bands for the second service according to a priority list of frequency bands for the second SUB 412 specified in the order of preference information 198G. On identifying availability of the second service on one of the frequency bands, the camping component 198C may camp the second SUB 412 on the identified frequency band.

In another example, the first service corresponding to the first SUB 408 is NR and the second service corresponding to the second SUB 412 is NR with the first SUB 408 and the second SUB 412 on the same first core network 190 (e.g., offered by one operator). When the UE 104 is switched on, the scanning component 198A may scan for one or more first services corresponding to the first SUB 408. For example, the scanning component 198A may scan one or more frequency bands for a first service according to a priority list of frequency bands for the first SUB 408 specified in the order of preference information 198G. On identifying availability of the first service on a first frequency band, the camping component 198C may camp the first SUB 408 on the first frequency band. The DSS determiner component 198D may determine whether the first frequency band supports DSS. For example, the DSS determiner component 198D may verify the first frequency band against a list of frequency bands that support DSS. In one implementation, the list of frequency bands that support DSS may be received from the base station 102/180. In another implementation, the list of frequency bands that support DSS may be stored at the UE 104. If the DSS determiner component 198D determines that the first frequency band supports DSS, the DSS determiner component 198D may send the information about the support for DSS on the first frequency band to the camping component 198C. The camping component 198C on receiving the information that the first frequency band supports DSS, may camp the second SUB 412 on the first frequency band. The DSS component 198 of the UE 104 allows the first SUB 408 and the second SUB 412 to camp on the same (first) frequency band when the first frequency band supports DSS. If the DSS determiner component 198D determines that the first frequency band does not support DSS, the DSS determiner component 198D may send the information about the first frequency band not supporting DSS to the scanning component 198A. The scanning component 198A may scan for one or more second services corresponding to the second SUB 412. For example, the scanning component 198A may scan one or more frequency bands for the second service according to a priority list of frequency bands for the second SUB 412 specified in the order of preference information 198G. On identifying availability of the second service on one of the frequency bands, the camping component 198C may camp the second SUB 412 on the identified frequency band.

In another example, the first SUB 408 may be an ENDC enabled LTE/NR (i.e., the first SUB 408 may switch between LTE and NR), and the second SUB 412 may be LTE. The first SUB 408 may switch from LTE to NR (e.g., when NR service is available at the base station 102/180). For example, the first SUB 408 may switch from LTE (on a first frequency band) to NR (on a second frequency band). The DSS determiner component 198D may determine whether the second frequency band supports DSS. If the DSS determiner component 198D determines that the second frequency band supports DSS, the DSS determiner component 198D may send the information about the support for DSS on the second frequency band to the camping component 198C. The camping component 198C, on receiving the information that the second frequency band supports DSS, may camp the second SUB 412 on the first frequency band. The DSS component 198 of the UE 104 allows the first SUB 408 and the second SUB 412 to camp on the same (second) frequency band when the first SUB 408 switches from LTE to NR on a frequency band (i.e., the second frequency band) that supports DSS. If the DSS determiner component 198D determines that the second frequency band does not support DSS, the DSS determiner component 198D may send the information about the second frequency band not supporting DSS to the scanning component 198A. The scanning component 198A may scan for one or more second services corresponding to the second SUB 412. On identifying availability of the second service on one of the frequency bands, the camping component 198C may camp the second SUB 412 on the identified frequency band.

In another example, the first SUB 408 may be NR, and the second SUB 412 may be LTE or NR. The first SUB 408 may switch from one cell to another cell (e.g., the UE 408 may perform a cell reselection for the first SUB 408). In one example, the switching component 198E may switch a first service corresponding to the first SUB 408 from a first frequency band to a second frequency band based on the reselection criteria 198F (as described above) and/or the order of preference information 198G. The switching component 198E may also switch the first service based on a reconfiguration message received from a base station of the first core network 190 (e.g., the reconfiguration message indicating to the UE 104 to switch service to the first base station 102/180). The DSS determiner component 198D may determine whether the second frequency band supports DSS. If the DSS determiner component 198D determines that the second frequency band supports DSS, the DSS determiner component 198D may send the information about the support for DSS on the second frequency band to the camping component 198C. The camping component 198C on receiving the information that the second frequency band supports DSS, may camp the second SUB 412 on the second frequency band. The DSS component 198 of the UE 104 allows the first SUB 408 and the second SUB 412 to camp on the same (second) frequency band in case of a cell reselection on the first SUB 408 and camping on a frequency band (i.e., the second frequency band) that supports DSS. In one implementation, the second SUB 412 may have an order of preference for frequency bands supporting the DSS (e.g., an order preference table stored in the order of preference information 198G), and the scanning component 198A may scan for a second service corresponding to the second subscription in accordance with the order of preference. When the scanning component 198A finds an available frequency band based on the order of preference, the scanning component 198A may send the information about the available frequency band to the camping component 198C, and the camping component 198C can then camp on the available frequency band. The DSS component 198 may not necessarily force the second SUB 412 to camp on the second frequency band and can allow the second SUB 412 to camp on a frequency band in accordance with the order of preference for the second SUB 412. If the DSS determiner component 198D determines that the second frequency band does not support DSS, the DSS determiner component 198D may send the information about the second frequency band not supporting DSS to the scanning component 198A. The scanning component 198A may not scan for services corresponding to the second SUB 412 (e.g., when a received signal strength for the second SUB 412 is above a threshold), or the scanning component 198A may scan for one or more second services corresponding to the second SUB 412. On identifying availability of the second service on one of the frequency bands, the camping component 198C may camp the second SUB 412 on the identified frequency band.

In each of the above examples, the scanning component 198A may scan for one or more first services corresponding to the first SUB 408 in accordance with a priority list of frequency bands (e.g., a priority list stored in the order of preference information 198G) for the first SUB 408. The priority list of frequency bands may include a first set of frequency bands supporting the DSS at a higher priority than a second set of frequency bands not supporting the DSS.

The UE 104 as described above with reference to FIG. 4 is not limited to including merely the described components, and the UE 104 includes a processor, a memory, and one or more components as needed for the UE 104 to perform communication with one or more communication networks. Further, each of the functions described in the above examples are not limited to be performed by the described components, but the processor of the UE 104 may perform these functions based on instructions stored in the memory and/or one or more components as described above.

Figure 5:
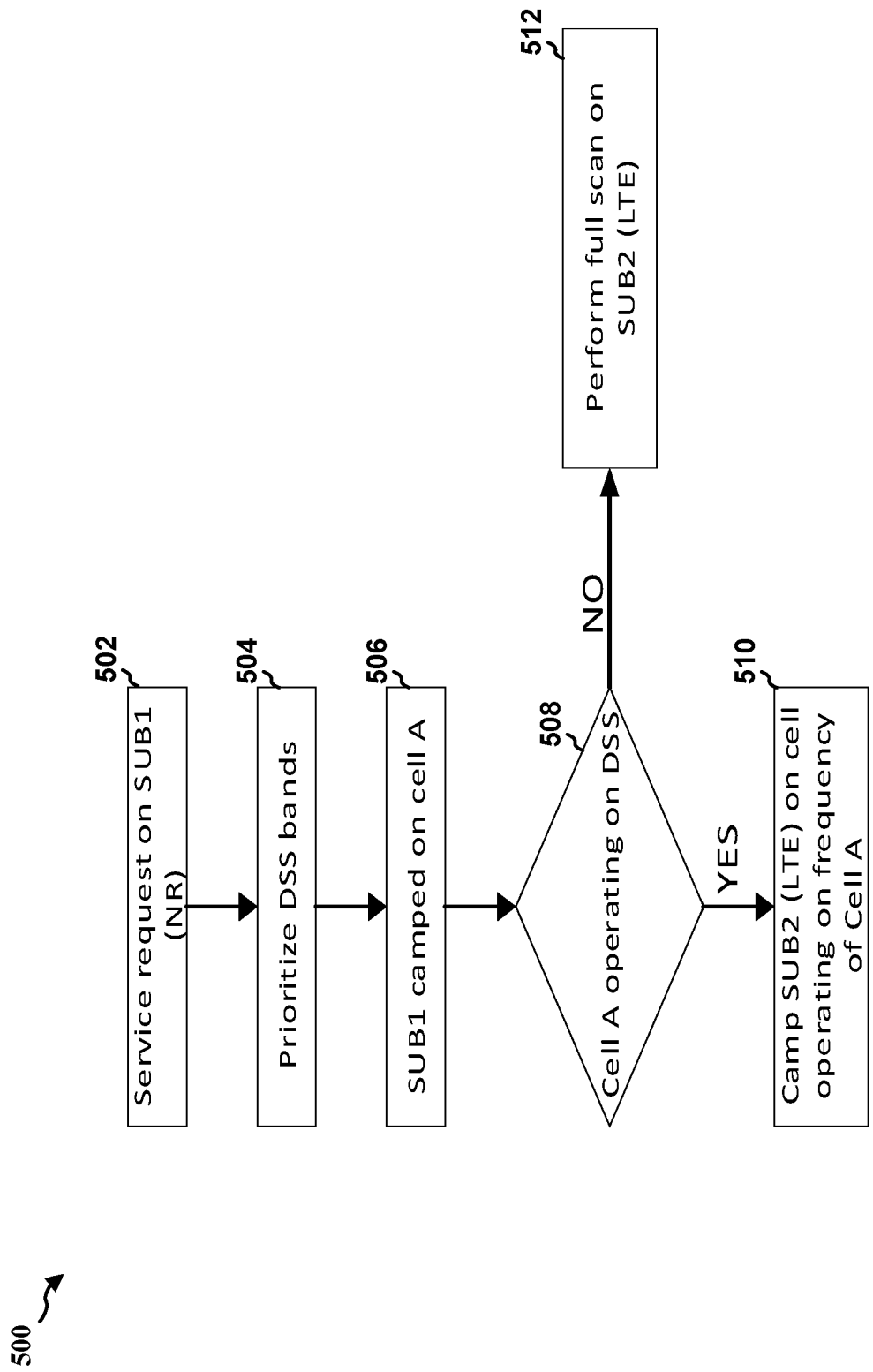
FIG. 5 is a flow diagram illustrating example operations for cell selection at a UE configured to communicate with multiple subscriptions.

FIG. 5 is a flowchart 500 of a method of wireless communication and cell selection at a UE. The UE may be similar to the UE 104 as described above with reference to FIGS. 1-4.

At block 502, the UE 104 receives a service request on the first SUB 408 (NR). For example, the DSS component 198 may receive a request to subscribe to the first SUB 408 based on one or more instructions stored in the first SIM 406.

At block 504, the UE 104 prioritizes DSS frequency bands for the first SUB 408. For example, the scanning component 198A may scan the frequency bands stored in the order of preference information 198G, with the frequency bands supporting DSS scanned before scanning any frequency bands that do not support DSS in accordance with the order of preference information 198G. The scanning component 198A may send the information about available frequency bands for the first SUB 408 to the camping component 198C.

At block 506, the UE 104 camps on a cell A for the first SUB 408. For example, the camping component 198C may camp on a first frequency band corresponding to the cell A for the first SUB 408.

At block 508, the UE 104 determines whether the cell A is operating on DSS. For example, the DSS determiner component 198D may determine whether the cell A is operating on DSS and send the information about whether the cell A is operating on DSS to the camping component 198C. If the cell A is operating on DSS, the UE 104 performs the operations at block 510. If the cell A is not operating on DSS, the UE 104 performs the operations at block 512.

At block 510, the UE 104 camps the second SUB 412 (LTE) on a cell operating on the frequency of cell A. For example, the camping component 198C may camp on the frequency of cell A for the second SUB 412, as described above with reference to FIG. 4.

At block 512, the UE 104 performs a full scan for the second SUB 412. For example, the scanning component 198A may perform a full scan for the second SUB 412 in accordance with the order of preference information 198G for the second SUB 412, as described above with reference to FIG. 4.

Figure 6:
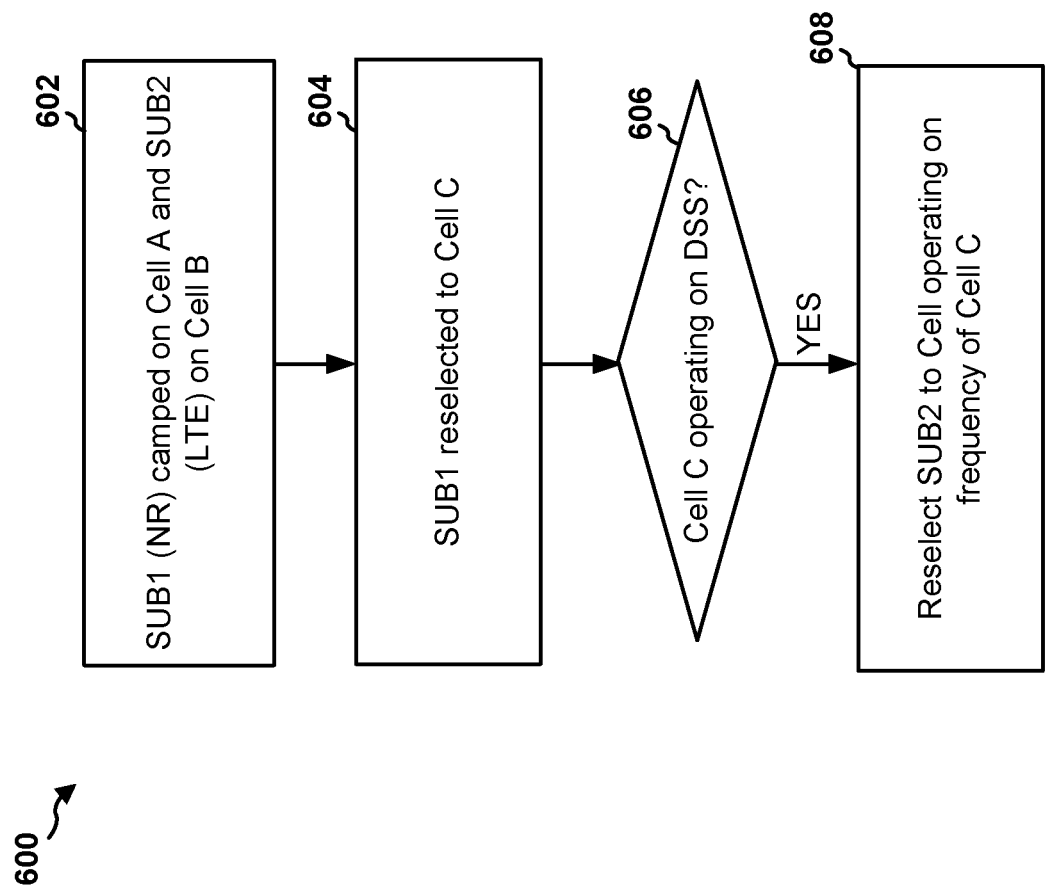
FIG. 6 is a flow diagram illustrating example operations for cell reselection at a UE configured to communicate with multiple subscriptions.

FIG. 6 is a flowchart 600 of a method of wireless communication and cell reselection at a UE. The UE may be similar to the UE 104 as described above with reference to FIGS. 1-4.

At block 602, the UE 104 is camped on cell A for the first SUB 408 (NR) and the UE 104 is camped on cell B for the second SUB 412 (LTE). For example, the camping component 198C may have camped on a frequency corresponding to cell A for the first SUB 408, and the camping component 198C may have camped on a frequency corresponding to cell B for the second SUB 412.

At block 604, the UE 104 reselects cell C for the first SUB 408. For example, the switching component 198E may switch the first SUB 408 from a cell A to the cell C, based on one or more reselection criteria, or a reconfiguration message, as described above with reference to FIG. 4.

At block 606, the UE 104 determines whether the cell C is operating on DSS. For example, the DSS determiner component 198D may determine whether the cell C is operating on DSS and send the information about whether the cell C is operating on DSS to the camping component 198C.

At block 608, the UE 104 reselects a cell operating on the frequency of cell C for the second SUB 412. For example, the camping component 198C may camp on a frequency band corresponding to the frequency band of cell C for the second SUB 412, as described above with reference to FIG. 4.

Figure 7:
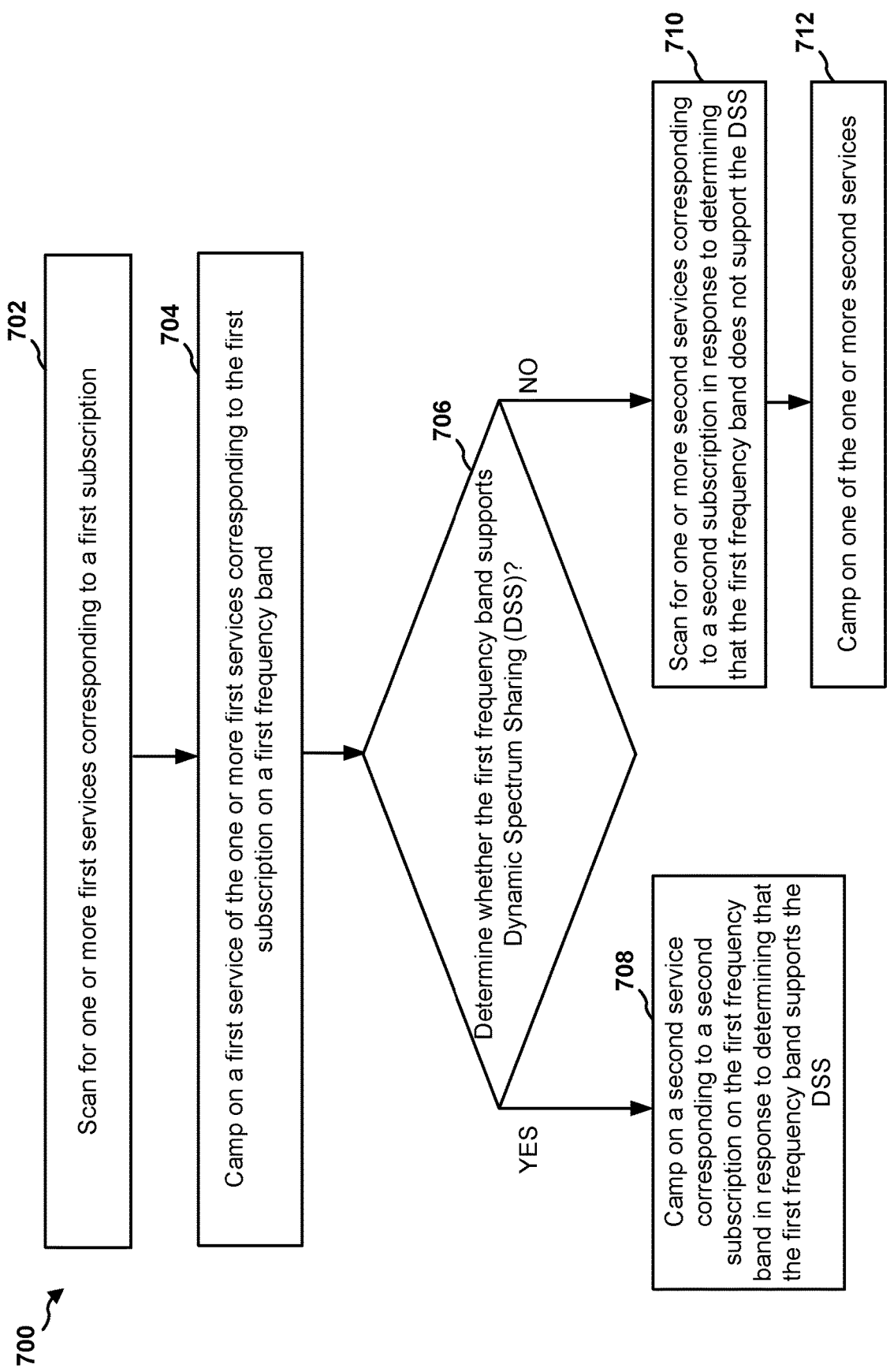
FIG. 7 is a flow diagram illustrating example operations for cell selection at a UE configured to communicate with multiple subscriptions.

FIG. 7 is a flowchart 700 of a method of cell selection at a UE configured to communicate with multiple subscriptions. The UE may be similar to the UE 104 as described above with reference to FIGS. 1-4. Further, each of the actions of the below-described methods may be performed by the UE 104, the DSS component 198, a subcomponent of the DSS component 198, or a processor on the UE 104 such as the controller/processor 359, the TX processor 368, and/or the RX processor 356 based on executing instructions stored in a memory, such as memory 360.

At block 702, the UE scans for one or more first services corresponding to a first subscription. In one implementation, the UE 104 (as described above with reference to FIG. 4) may scan for one or more first services corresponding to the first SUB 408. For example, a processor in the UE 104 may read one or more instructions stored in the first SIM 406, the scanning component 198A, the order of preference information 198G and/or a memory of the UE 104 to scan for the one or more first services corresponding to the first SUB 408.

At block 704, the UE camps on a first service of the one or more first services corresponding to the first subscription on a first frequency band. In one implementation, the UE 104 may camp on the first service of the one or more first services corresponding to the first SUB 408 on the first frequency band. For example, the processor of the UE 104 may execute one or more instructions stored in the memory and/or the camping component 198C to camp on the first service corresponding to the first SUB 408 on the first frequency band (e.g., an available frequency band) based on the scan at block 702.

At block 706, the UE determines whether the first frequency band supports DSS. In one implementation, the UE 104 may determine whether the first frequency band supports DSS. For example, the processor of the UE 104 may execute one or more instructions stored in the DSS determiner component 198D and/or the memory of the UE 104 to determine whether the first frequency band (camped on at block 704) supports DSS, as described above in FIG. 4. If the UE 104 determines that the first frequency band supports DSS, the UE performs operations at block 708. If the UE 104 determines that the first frequency band does not support DSS, the UE 104 performs operations at blocks 710 and 712.

At block 708, the UE camps on a second service corresponding to a second subscription on the first frequency band in response to determining that the first frequency band supports the DSS. In one implementation, the UE 104 camps on the second service corresponding to the second SUB 412 on the first frequency in response to determining that the first frequency band supports DSS. For example, the processor of the UE 104 may execute one or more instructions stored in the camping component 198C and/or the memory of the UE 104 to camp on the second service corresponding to the second SUB 412 on the first frequency band.

At block 710, the UE scans for one or more second services corresponding to a second subscription in response to determining that the first frequency band does not support the DSS. In one implementation, the UE 104 may scan for the one or more second services corresponding to the second SUB 412 in response to determining that the first frequency band does not support DSS. For example, the processor of the UE 104 may execute one or more instructions stored in the second SIM 410, the scanning component 198A, the order of preference information 198G to scan for the one or more second services corresponding to the second SUB 412 in response to determining (at block 706) that the first frequency band does not support DSS.

At block 712, the UE camps on one of the one or more second services. In one implementation, the UE 104 camps on the one of the one or more second services. For example, the processor of the UE 104 may execute one or more instructions stored in the camping component 198C to camp on one of the one or more second services based on the scan at block 710.

Figure 8:
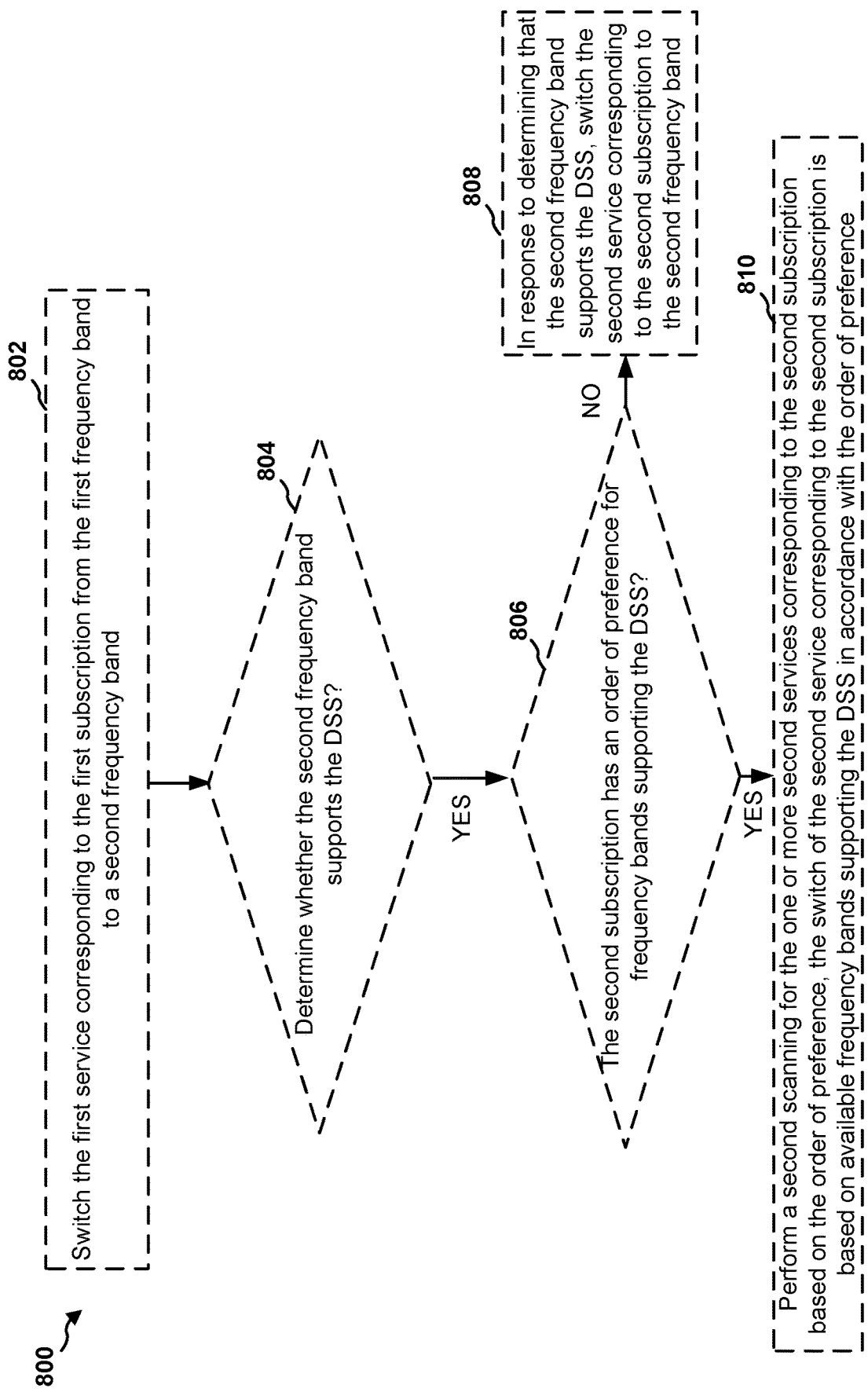
FIG. 8 is a flow diagram illustrating example operations for cell reselection at a UE configured to communicate with multiple subscriptions.

FIG. 8 is a flowchart 800 of a method of cell reselection at a UE configured to communicate with multiple subscriptions. The UE may be similar to the UE 104 as described above with reference to FIGS. 1-4. The UE 104 of the FIGS. 1-4 as described above may optionally perform the operations described in the flowchart 800 in combination or alternately with the operations described in the flowchart 700 of FIG. 7. Further, each of the actions of the below-described methods may be performed by the UE 104, the DSS component 198, a subcomponent of the DSS component 198, or a processor on the UE 104 such as the controller/processor 359, the TX processor 368, and/or the RX processor 356 based on executing instructions stored in a memory, such as memory 360.

At block 802, the UE switches the first service corresponding to the first subscription from the first frequency band to a second frequency band. In one implementation, the UE 104 (as described above with reference to FIG. 4) may switch the first service corresponding to the first SUB 408 from the first frequency band to the second frequency band. The UE 104 may be camped on the first frequency band for the first SUB 408 and may switch to the second frequency band based on the reselection criteria 198F, a reconfiguration message from a base station of the wireless communication system 400, etc. For example, the processor of the UE 104 may execute one or more instructions stored in the reselection criteria 198F, the switching component 198E, the first SIM 406, the order of preference information 198G and/or the memory of the UE 104 to switch the service corresponding to the first SUB 408 from the first frequency band to the second frequency band.

At block 804, the UE determines whether the second frequency band supports the DSS. In one implementation, the UE 104 determines whether the second frequency band supports the DSS. For example, the processor of the UE 104 may execute one or more instructions stored in the DSS determiner component 198D and/or the memory of the UE 104 to determine whether the second frequency band supports the DSS. If the UE 104 determines that the second frequency band supports the DSS, the UE 104 may perform operations at block 806.

At block 806, the UE determines whether the second subscription has an order of preference for frequency bands supporting the DSS. In one implementation, the UE 104 determines whether the second SUB 412 has the order of preference for the frequency bands supporting the DSS. For example, the processor of the UE 104 may execute one or more instructions stored in the order of preference information 198G and/or the memory of the UE 104 to determine whether the second SUB 412 has the order of preference for the frequency bands supporting the DSS. If the UE 104 determines that the second SUB 412 has the order of preference for the frequency bands supporting the DSS, the UE 104 may perform operations at block 810. If the UE 104 determines that the second SUB 412 does not have the order of preference for the frequency bands supporting the DSS, the UE 104 may perform operations at block 808.

At block 808, in response to determining that the second frequency band supports the DSS, the UE switches the second service corresponding to the second subscription to the second frequency band. In one implementation, the UE 104 switches the second service corresponding to the second SUB 412 to the second frequency band in response to determining that the second frequency band supports the DSS. For example, the processor of the UE 104 may execute one or more instructions stored in the second SIM 410, the switching component 198E, the camping component 198C and/or the memory of the UE to switch the second service corresponding to the second SUB 412 to the second frequency band. The UE 104 is not limited to performing the operations at block 808 after block 806, and in one implementation the UE 104 may perform the operations at block 808 after block 804.

At block 810, the UE performs a second scanning for the one or more second services corresponding to the second subscription based on the order of preference, the switch of the second service corresponding to the second subscription is based on available frequency bands supporting the DSS in accordance with the order of preference. In one implementation, the UE 104 may perform the second scanning for the one or more second services corresponding to the second SUB 412 based on the order of preference information 198G. The UE 104 may switch the second service corresponding to the second SUB 412 based on available frequency bands supporting the DSS in accordance with the order of preference information 198G for the second SUB 412. For example, the processor of the UE 104 may execute one or more instructions stored in the second SIM 410, the scanning component 198A, the switching component 198E, the order of preference information 198G and or the memory of the UE 104 to perform the second scanning for the one or more second services corresponding to the second SUB 412 based on the order of preference information 198G, the switch of the second service corresponding to the second SUB 412 being based on available frequency bands supporting the DSS in accordance with the order of preference information 198G.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communicating with multiple subscriptions at a wireless device, comprising:
    scanning for one or more first services corresponding to a first subscription;
    camping on a first service of the one or more first services corresponding to the first subscription on a first frequency band;
    determining whether the first frequency band supports Dynamic Spectrum Sharing (DSS);
    camping on a second service corresponding to a second subscription on the first frequency band in response to determining that the first frequency band supports the DSS;
    scanning for one or more second services corresponding to a second subscription in response to determining that the first frequency band does not support the DSS; and
    camping on one of the one or more second services.

2. The method of claim 1, wherein the first service corresponding to the first subscription is New Radio (NR).

3. The method of claim 2, wherein the second service corresponding to the second subscription is Long Term Evolution (LTE).

4. The method of claim 2, wherein the second service corresponding to the second subscription is New Radio (NR).

5. The method of claim 1, further comprising:
    switching the first service corresponding to the first subscription from the first frequency band to a second frequency band;
    determining whether the second frequency band supports the DSS; and
    in response to determining that the second frequency band supports the DSS, switching the second service corresponding to the second subscription to the second frequency band.

6. The method of claim 5, wherein the switching of the first service corresponding to the first subscription is based on a reselection criteria, the reselection criteria comprising one or a combination of:
    frequency band priority;
    received signal strength; or
    rank index.

7. The method of claim 5, wherein the switching of the first service corresponding to the first subscription is based on a reconfiguration message received from a base station.

8. The method of claim 5, further comprising:
    in response to determining that the second subscription has an order of preference for frequency bands supporting the DSS, performing a second scanning for the one or more second services corresponding to the second subscription based on the order of preference; and
    wherein the switching of the second service corresponding to the second subscription is based on available frequency bands supporting the DSS in accordance with the order of preference.

9. The method of claim 5, wherein the first service corresponding to the first subscription is New Radio (NR).

10. The method of claim 9, wherein the second service corresponding to the second subscription is Long Term Evolution (LTE).

11. The method of claim 9, wherein the second service corresponding to the second subscription is New Radio (NR).

12. The method of claim 1, wherein the scanning for first service corresponding to the first subscription comprises scanning for the first service according to a priority list of frequency bands.

13. The method of claim 12, wherein the priority list of frequency bands includes a first set of frequency bands supporting the DSS at a higher priority than a second set of frequency bands not supporting the DSS.

14. An apparatus for communicating with multiple subscriptions, comprising:
    a memory; and
    at least one processor coupled to the memory and configured to:
        scan for one or more first services corresponding to a first subscription;
        camp on a first service of the one or more first services corresponding to the first subscription on a first frequency band;

determine whether the first frequency band supports Dynamic Spectrum Sharing (DSS);
camp on a second service corresponding to a second subscription on the first frequency band in response to determining that the first frequency band supports the DSS;
scan for one or more second services corresponding to a second subscription in response to determining that the first frequency band does not support the DSS; and
camp on one of the one or more second services.

15. The apparatus of claim 14, wherein the first service corresponding to the first subscription is New Radio (NR).

16. The apparatus of claim 15, wherein the second service corresponding to the second subscription is Long Term Evolution (LTE).

17. The apparatus of claim 15, wherein the second service corresponding to the second subscription is New Radio (NR).

18. The apparatus of claim 14, wherein the processor is further configured to:
switch the first service corresponding to the first subscription from the first frequency band to a second frequency band;
determine whether the second frequency band supports the DSS; and
in response to determining that the second frequency band supports the DSS, switch the second service corresponding to the second subscription to the second frequency band.

19. The apparatus of claim 18, wherein the switch of the first service corresponding to the first subscription is based on a reselection criteria, the reselection criteria comprising one or a combination of:
frequency band priority;
received signal strength; or
rank index.

20. The apparatus of claim 18, wherein the switch of the first service corresponding to the first subscription is based on a reconfiguration message received from a base station.

21. The apparatus of claim 18, wherein the processor is further configured to:
in response to determining that the second subscription has an order of preference for frequency bands supporting the DSS, perform a second scanning for the one or more second services corresponding to the second subscription based on the order of preference; and
wherein the switch of the second service corresponding to the second subscription is based on available frequency bands supporting the DSS in accordance with the order of preference.

22. The apparatus of claim 18, wherein the first service corresponding to the first subscription is New Radio (NR).

23. The apparatus of claim 22, wherein the second service corresponding to the second subscription is Long Term Evolution (LTE).

24. The apparatus of claim 22, wherein the second service corresponding to the second subscription is New Radio (NR).

25. The apparatus of claim 15, wherein the scan for first service corresponding to the first subscription comprises the processor configured to scan for the first service according to a priority list of frequency bands.

26. The apparatus of claim 25, wherein the priority list of frequency bands includes a first set of frequency bands supporting the DSS at a higher priority than a second set of frequency bands not supporting the DSS.

27. An apparatus for communicating with multiple subscriptions, comprising:
means for scanning for one or more first services corresponding to a first subscription;
means for camping on a first service of the one or more first services corresponding to the first subscription on a first frequency band;
means for determining whether the first frequency band supports Dynamic Spectrum Sharing (DSS);
means for camping on a second service corresponding to a second subscription on the first frequency band in response to determining that the first frequency band supports the DSS;
means for scanning for one or more second services corresponding to a second subscription in response to determining that the first frequency band does not support the DSS; and
means for camping on one of the one or more second services.

28. The apparatus of claim 27, further comprising:
means for switching the first service corresponding to the first subscription from the first frequency band to a second frequency band;
means for determining whether the second frequency band supports the DSS; and
means for in response to determining that the second frequency band supports the DSS, switching the second service corresponding to the second subscription to the second frequency band.

29. A non-transitory computer-readable medium storing computer executable code, the code when executed by a processor causes the processor to:
scan for one or more first services corresponding to a first subscription;
camp on a first service of the one or more first services corresponding to the first subscription on a first frequency band;
determine whether the first frequency band supports Dynamic Spectrum Sharing (DSS);
camp on a second service corresponding to a second subscription on the first frequency band in response to determining that the first frequency band supports the DSS;
scan for one or more second services corresponding to a second subscription in response to determining that the first frequency band does not support the DSS; and
camp on one of the one or more second services.

30. The non-transitory computer-readable medium of claim 29, further comprising the computer executable code, the code when executed by the processor causes the processor to:
switch the first service corresponding to the first subscription from the first frequency band to a second frequency band;
determine whether the second frequency band supports the DSS; and
in response to determining that the second frequency band supports the DSS, switch the second service corresponding to the second subscription to the second frequency band.

* * * * *